S. A. REEVE.
COMPENSATING METER.
APPLICATION FILED MAY 27, 1911.
1,278,077.
Patented Sept. 3, 1918.
3 SHEETS—SHEET 1.
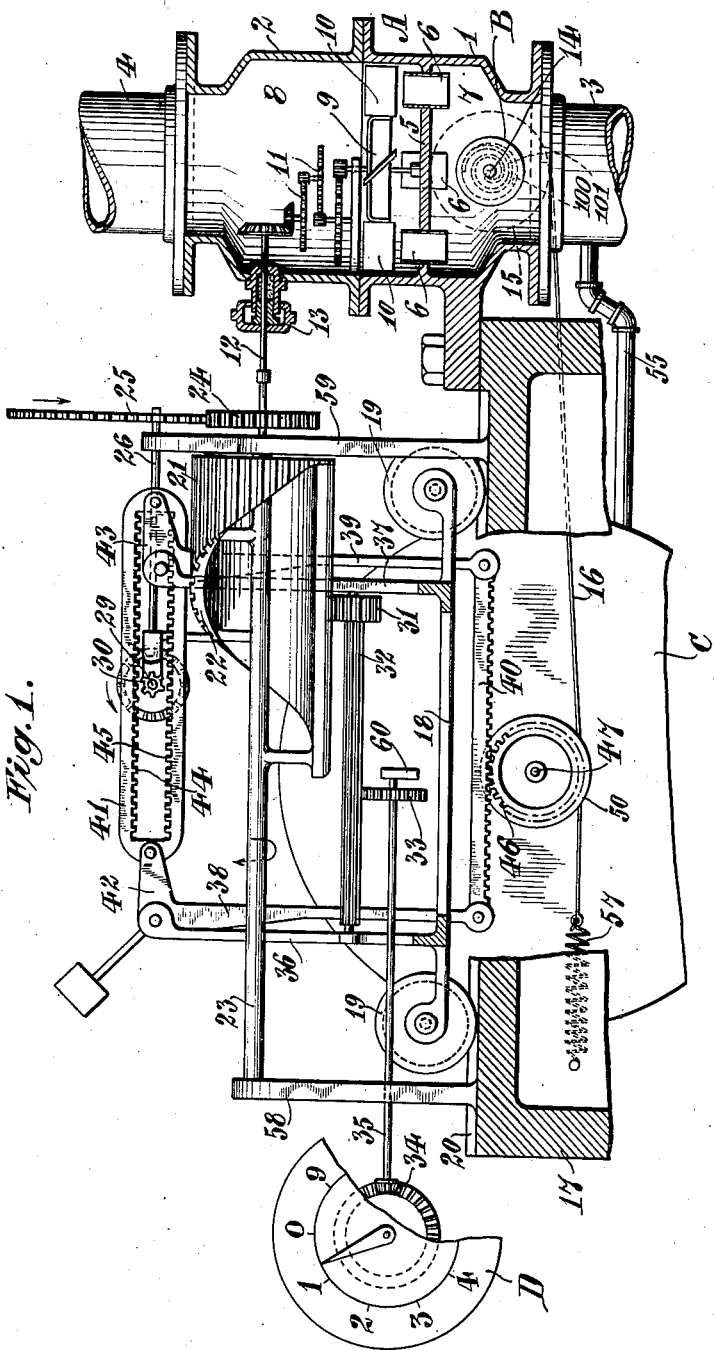

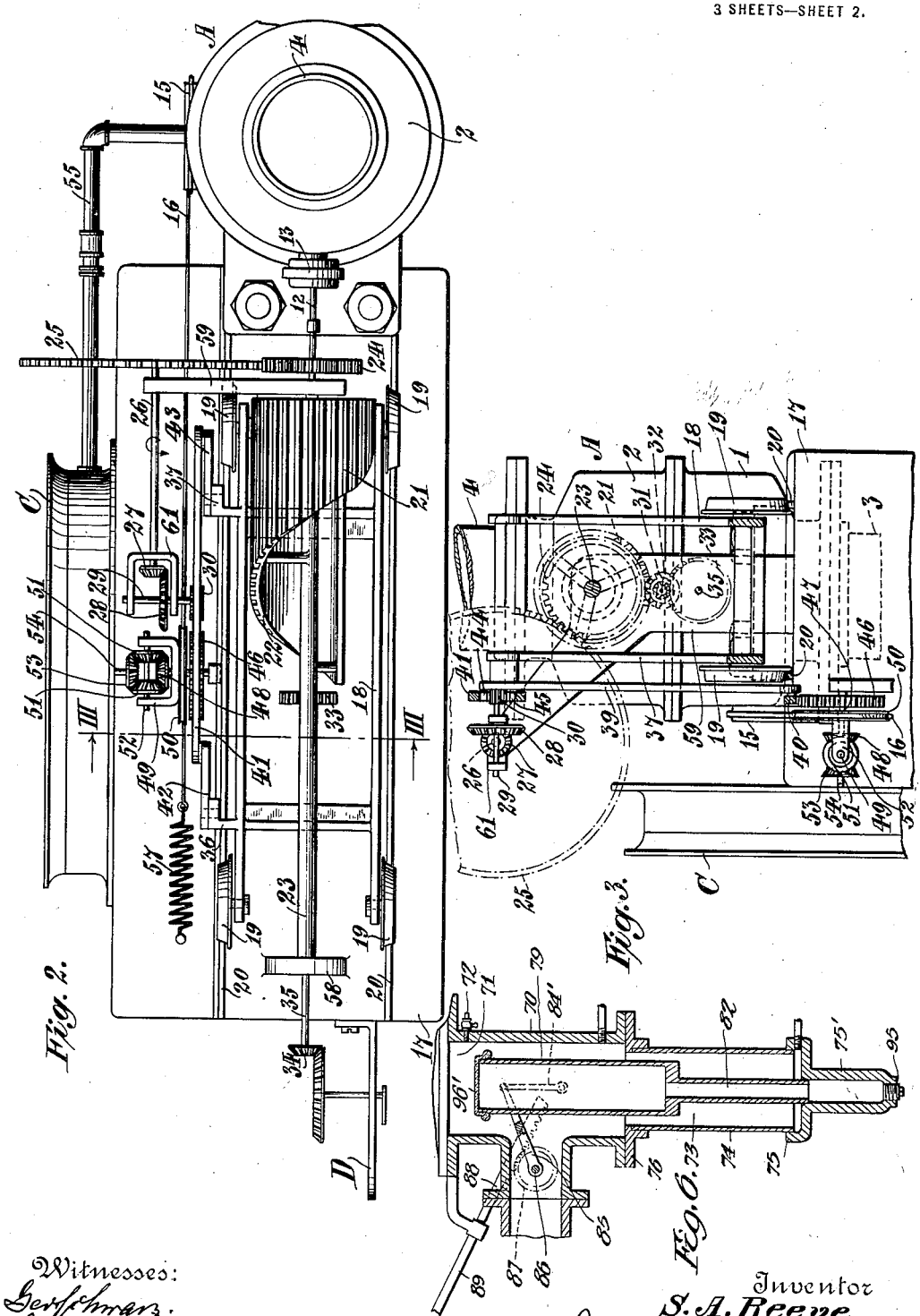

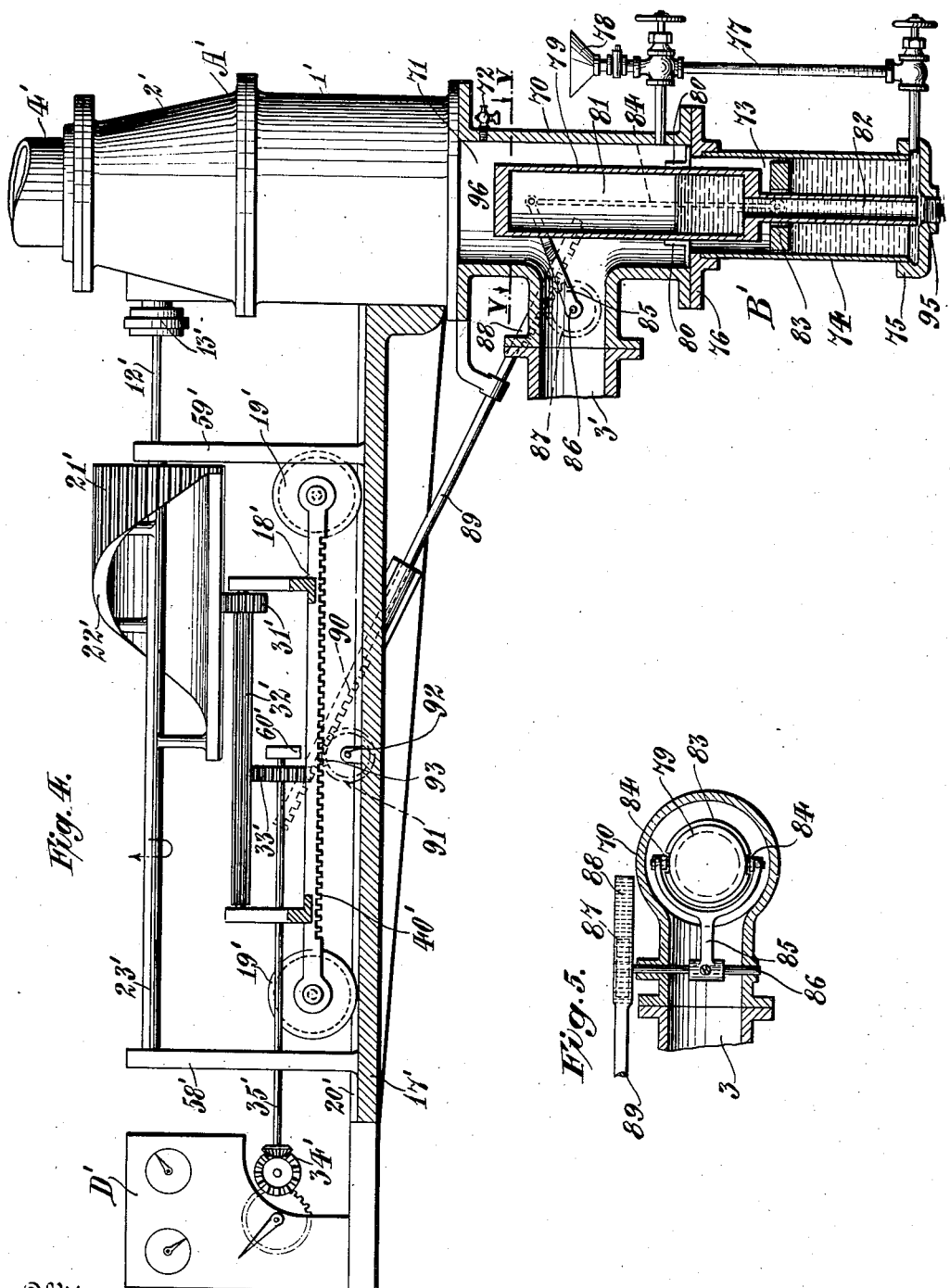

UNITED STATES PATENT OFFICE.

SIDNEY A. REEVE, OF NEW YORK, N. Y., ASSIGNOR, BY MESNE ASSIGNMENTS, TO ROTARY METER COMPANY, A CORPORATION OF NEW YORK.

COMPENSATING METER.

1,278,077.   Specification of Letters Patent.   Patented Sept. 3, 1918.

Application filed May 27, 1911. Serial No. 629,845.

*To all whom it may concern:*

Be it known that I, SIDNEY A. REEVE, a citizen of the United States, and a resident of Tompkinsville, Staten Island, county of Richmond, city and State of New York, have invented certain new and useful Improvements in Compensating Meters, set forth in the following specification.

The present invention relates to meters for measuring the flow of gas.

Unlike liquids the volume of a given mass of gas is subject to comparatively great change upon a change in any of the well known density-influencing qualities such as temperature, pressure and chemical composition. For this reason the mere measurement of the volume-flow of a gas, which is continually subject to changes in such qualities as temperature and pressure, is often inadequate to give a measurement of the true value of the gas-flow. Satisfactory and accurate means for measuring the volume-flow of a gas are well known to the art and for many reasons their employment for the measurement of gas-flow is most practical and desirable. When the volume-flow of a gas is being measured the qualities temperature, pressure and chemical composition become mass-influencing qualities and they are so regarded in this application, although they are properly termed density-influencing qualities. The combination of any two or more of such qualities is also regarded itself as a density-influencing quality.

The broad object of the present invention is to measure the mass-flow of a gas.

A further object of the invention is to measure the volume-flow of a gas and to compensate such volume-flow-measurement proportionally to changes in a density-influencing quality of the flowing gas.

In addition to the above, it is an object of the invention to provide for the accomplishment of the above general objects through the medium of improved mechanical means capable of measuring, integrating and showing in total on an index the aggregate mass of gas passed through the meter throughout any given period.

The above and further points of the invention are set forth in the following claims which should be read in connection with the following specification and accompanying drawings which respectively describe and show illustrative embodiments of the invention.

Like characters designate corresponding parts in the drawings, in which—

Figure 1 is a semi-diagrammatic view, partly in elevation and partly in vertical section, showing an embodiment of the invention employing independent measurers for temperature and pressure changes;

Fig. 2 is a plan-view of the structure shown in Fig 1;

Fig. 3 is a sectional view, partly in end elevation, taken through line III—III of Fig. 2;

Fig. 4 is a view corresponding to Fig. 1 showing a modified embodiment of the invention in which a density measure is employed in lieu of only a temperature and pressure measurer;

Fig. 5 is a detail horizontal section through line V—V of Fig. 4; and Fig. 6 is a fragmentary view corresponding to the lower portion of Fig. 4 showing a modification in which the bottle is itself movable.

Referring primarily to the embodiment of Figs. 1, 2 and 3, the volume-meter A is shown comprising two hollow casings 1 and 2, the inlet-pipe 3 entering into the lower end of the casing 1 and the outlet-pipe 4 taking the discharge from the top of the casing 2.

The horizontal partition or port-plate 5, provided with a circumferential ring of tubular ports 6 divides the interior of the hollow casings 1 and 2 into chambers 7 and 8. A turbine-wheel 9 is rotatably mounted upon a vertical axis so that its inclined vanes 10 are constrained to rotate in a path directly over the ports 6. A suitable and suitably mounted speed-reduction gear-train 11 transmits the rotary movement of the turbine-wheel 9 to the shaft 12 passing out of the casing 2 through the stuffing box 13.

Within the chamber 7 is mounted a measurer B of the desired density-influencing quality and shown as a rotary thermometer, which actuates the spindle 14 passing out of the casing 1 through a suitable stuffing box and operative to rotate the exterior drum 15 commensurately with changes in absolute temperature of the gas within the casing 7 and to actuate the cord 16 wound upon the drum 15. In Fig. 1, B designates any standard thermometer of the rotary type, 14 is the spindle of such a thermometer. A thermostatic coil 101 is indicated in dotted lines as operatively connected with the shaft 14.

17 is a fixed base-plate or base-casting to which the pressure gage C and the integrating index D are suitably secured and which serves as a support and mounting for the various parts, presently to be described, of the mechanism for combining the effect of the volume-meter A and the quality measurers B and C.

The rigid carriage frame 18 is permitted a longitudinal movement along the casting 17 by its four bearing wheels 19 which are guided by the ways or track 20 on the casting 17.

A gear drum 21 having a cylindrical driving surface terminating in a helical edge 22 is mounted on the horizontally journaled shaft 23 to rotate on an axis parallel to the track 20 and in line with the volume-meter-shaft 12, to which it is coupled.

The volume-meter-shaft 12 also has fixed to it the gear 24 in mesh with the gear 25 carried by the horizontally journaled shaft 26, the opposite end of which is fitted with the bevel-gear 27 in mesh with the bevel-gear 28 fixed to the cross shaft 29, which is fitted at its forward end with the spur-gear 30, whereby the spur-gear 30 is constantly driven by the volume-meter-shaft 12 at a considerably reduced speed to constitute a part of a mechanical relay as will hereinafter be described.

The driving connection with the integrating index D from the volume-meter-shaft 12 comprises, in addition to the helical gear drum 21, the gear 31 adapted operatively to engage the surface of the gear drum 21; the elongated gear 32; the meshing gear 33; and the bevel-gear 34 driven by the interconnecting shaft 35. The gears 31 and 32 are mounted on a horizontal axis parallel with the shaft 23 but are actually journaled upon the uprights 36 and 37 of the movable carriage 18 so that the gear 31 can travel axially along the engaging face of the helical gear 21. The shaft 35 is journaled in suitable stationary supports so that the elongated gear 32 is always in mesh with the gear 33 despite the relative axial movement.

The bell-crank levers 38 and 39 are pivoted at their elbows to the upper ends of the uprights 36 and 37 and are secured at their lower ends by pivot-connections with the horizontal rack 40. A double rack frame 41 is pivoted in a horizontal position at its ends to the ends of the short arms 42 and 43 of the bell cranks 38 and 39 and is provided interiorly with the parallel opposing rack-teeth 44 and 45, overlying and underlying the spur-gear 30 respectively.

The parts just described constitute a mechanical relay for the drive-gear 46, which meshes with the rack 40 and is fixed to the cross-shaft 47, the rear end of which is fixed to the bevel gear 48, of the differential gear 49. The drum 50 is attached to the yoke of the differential gear 49, both said drum and said yoke having a loose bearing on shaft 47. The planet gears 51 are loosely mounted on the yoke-shaft 52 and are in mesh with the bevel gear 53 fixed to the measuring shaft 54 of the pressure gage C. The pressure gage C is connected to the gas main through the medium of the duct 55 which is shown entering the supply main 3.

A cord 16 actuated by the thermometer B engages the periphery of the drum 50 by suitable attachment, and its far end is anchored by the tension-spring 57 which is balanced against the action of the rotary thermometer B so as to provide for a two-direction movement of the cord 16 operating the drum 50.

It is to be understood that the various gearing overlying the base casting 17 is mounted on suitable supports such as the supports 58, 59, 60, and 61 which may in turn be supported by the base casting 17.

*Operation*, (Figs. 1, 2 and 3.)

The rotary vane meter A is operated commensurately with the volume-flow of gas through the main 3, 4 and causes a rotation of the helical gear-drum 21, which is likewise commensurate with the said volume-flow of gas. The index D and the gearing for driving the same may be set and proportioned so that, with the spur gear 31 occupying the longitudinal position relatively to the helical gear-drum 21 shown in Fig. 1 of the drawings, the index D will truly integrate and register the actual mass of gas which has passed through the main 3, 4, throughout a given period, provided the mass-influencing-qualities of the flowing gas remain constant and equal to the predetermined values for which the apparatus is set. Of course, any change in a density-influencing-quality above or below this predetermined value would introduce an error in the registration of mass for the index D, were no means provided to compensate for such change. The axially movable gear 31 in combination with the helical gear-drum 21 is one embodiment of a mechanism capable of compensating for such changes. The relative pitch of the helical edge 22 of gear drum 21 and the axial movement imparted to the gear 31 are so proportioned that the index D will give a true reading of the mass of gas passed. The axial movement for the gear 31 is controlled by the combined influence of the quality-measurers B and C. These quality-measurers, shown as a rotary thermometer B and a pressure gage C, are incapable of delivering any considerable power. The power delivered there-from is therefore, not relied upon for shifting the carriage which effects the movement of gear 31. A mechanical relay previously described and comprised in the swinging frame made up of the parts 38, 39, 40 and 49 makes it feasible to employ power from the turbine 9 for moving the carriage 18, while only sufficient power to effect movement of the balanced double rack 41 is required of the quality-measurers B and C.

In the embodiment illustrated in Figs. 1, 2 and 3 the effects of both the thermometer B and the pressure gage C are combined through the medium of the differential mechanism 49 so that the cross-shaft 47 and its attached gear 46 are rotated commensurately with the combined effect of changes in both pressure and temperature for the gas. Through the medium of the differential gear 49, a true combination of the effect of these quality changes is made regardless of one being a positive (+) change and the other a negative (−) change.

With the gears in the position illustrated the index D is operated intermittently and a certain amount for each rotation of the gear drum 21, which certain amount is a certain function of the equal movements of the volume-flow-measurer A. Should such a change take place in a mass-influencing quality as to increase the density or specific mass of the gas, the gear 46 will then be rotated in a clockwise direction so as to shift the rack 40 slightly to the right, uptilting the short arms 42 and 43 of the bell cranks to lift the rack 45 into mesh with the gear 30, which constantly rotates in a counter-clockwise direction. Of course, the rotation of the gear 46 tends to shift the entire carriage 18 to the right but may not be possessed of sufficient power to accomplish this. On the other hand, the gear 30 is possessed of considerable power and while in mesh with the rack 45 shifts the entire carriage 18 to the right, carrying the gear 31 to a new axial position against the gear drum 21, in which position the circumferential engagement of the drum 21 with the gear 31 is increased according to a predetermined ratio fixed by the pitch of the helical edge 22. This movement of the carriage 18 to the right continues just as far as, and no farther than, the amount measured by the movement of the actuating gear 46. This is obvious since the arresting of movement for the gear 46 will hold the rack 40 against longitudinal movement, causing any further movement of the carriage to lower the double rack frame 41 into the position shown in Fig. 1, so that the driving gear 30 is out of mesh therewith.

Should the combined effects of the quality measurers B and C be such as to indicate a decrease in density of the flowing gas, a counter-clockwise movement of the gear 46 takes place which results in lowering the rack 44 into engagement with the driving gear 30 and the consequent shifting of the gear 31 to the left into the proper axial position against the gear drum 21, in which a reduced circumference of the gear drum 21 operatively engages the gear 31.

Thus each axial position of the gear 31 on the helical drum 21 determines a certain extent of the circumference of the helical drum which alone is operative to drive the index D through the medium of gear 31 and which, relatively to the complete circular circumference of drum 21, is a certain function of the flow of gas measured by one complete rotation of shaft 12 of the volume-flow-measurer A. The index D integrates these respective functions for such successive equal movements of the volume-flow-measurer A and registers the total mass-flow in suitable measuring units. In other words, the compensating action in response to changes in mass-influencing-qualities of the gas is accomplished by varying the part or proportion of each rotation of the drum 21 that can be operative for actually driving the index D. Of course, the form of compensating gearing is merely illustrative.

*Modification:*

Figs. 4 and 5 illustrate a modification in which the apparatus B′ itself gives a measurement of the combined effect of all density-influencing-qualities of the gas, in other words, a measurement of the density of the gas.

The volume-meter A′ is substantially identical with the volume-meter A previously described and operates to drive the helical gear drum 21′ commensurately with the volume flow of gas through the main 3′, 4′.

Beneath the volume-meter A′ a suitable casting 70 provides an enlarged chamber 71 which may be opened and closed to the atmosphere through the pet-cock 72. The chamber 71 is open to the lower chamber 73 which is formed by the cylindrical shell 74 provided with a cap 75 and secured to the casting 70 by the flanged coupling 76, 77 is a liquid-gage of ordinary construction communicating with the chambers 70 and 73, which together form a pocket. 78 is a filling funnel.

The hollow inverted bottle-shaped caisson 79 is fixed in vertical position within the chambers 71 and 73 and held in place by the lugs 80. Its top portion provides an enlarged chamber 81 for containing elastic gas of a suitable composition as the standard for relative measurement. The neck portion 82 is open and projects into the bottom of the chamber 73 and is shown encircled by an independently movable annular float-body 83.

Links 84 connect the float-body 83 with the arms of the crotch-lever 85 fixed to the shaft 86 projecting out of the casting 70 through a suitable stuffing box. Shaft 86 is exteriorly fitted with the gear 87 in mesh with the rack 88, which, through the medium of the connecting rod 89 drives the rack 90 in mesh with the gear 91 which through the medium of stub-shaft 92 drives the gear 93 in mesh with the rack 40'.

In Figs. 4 and 5, the parts designated by primed characters, such as 12', correspond substantially with parts shown in Figs. 1, 2 and 3 which are designated by corresponding unprimed characters, such as 12. Thus, although the density measurer B' may itself have sufficient power to move a gear carriage and is shown geared to carriage rack 40', it is intended to operate in the same manner as the relay rack 40. The density measurer B' is a simple modification for use in lieu of separate quality measurers such as the thermometer B and the pressure gage C.

Operation.

Obviously the axial position of the gear 31' relatively to the gear drum 21' is determined by the vertical position of the float 83.

To set the density-measurer B' the petcock 72 may be opened so that the pressure within the pocket or chambers 71 and 73 is that of the atmosphere. A suitable liquid is poured into the chamber 73 through the funnel 78. As soon as this liquid covers the mouth of the neck 82, the gas, of any desired composition with which the bottle 81 may be filled, is trapped therein. The liquid for filling chamber 73 should be heavier than the fluid to be measured and may be mercury, oil, water or any other suitable liquid. The pouring of liquid into the chamber 73 continues until the level has risen to some predetermined mark near the top of chamber 73, when the pet-cock and funnel valve should be closed.

If pressure is now brought to bear upon the gas entrapped in the bottle 79 the liquid rises within the chamber 81 and falls within the chamber 73. The float 83 sinks and causes an axial movement of gear 31' to the right.

A rise in temperature of the gas surrounding the bottle 79 causes a lowering of the liquid within the bottle 79 and a rise of the float 83, with axial movement of gear 31' to the left. Opposite changes in temperature or pressure cause reverse axial movements for gear 31'. In fact both changes of temperature and pressure are thus combined by this density-measurer.

The liquid within the apparatus may be poured off at will through the cap 75 which which is provided with a drain plug 95.

Since the power of the density-measurer B' is practically unlimited (there being any needed volume of displacement available for operating the float 83) Fig. 4 shows no mechanical relay between the actuating rack 90 and the carriage 18'; and this simplicity constitutes one of the advantages of the invention. But if it be desired to minimize the dimensions of the density-measurer B', and therefore its power, certainty of operation could be secured by the inclusion of such relay, as described for Figs. 1, 2 and 3.

If desired, the bottle 79 itself may be made vertically movable (see Fig. 6) by removing the anchoring lugs 80 and causing links 84' to be directly pivoted to the bottle proper instead of to the float 83, as are the links 84. In this modification the bottle serves in lieu of the float 83, which is eliminated, the bottle floating upon the liquid in chamber 73. In this modification it is preferable that the wall 96 be replaced by a resilient diaphragm 96', such as a rubber diaphragm or its equivalent, whereas with the fixed bottle all its walls are of impervious, rigid material. To accommodate the downward movement of the bottle 79 the cap 75 should be provided with a downward extension 75' in which the neck 82 works.

The various embodiments shown and described are to be understood as merely illustrative of the present invention, while what is claimed and desired to be secured by United States Letters Patent is:—

1. A compensating meter for measuring the flow of gas comprising, a rotary-vane-meter operated proportionally to the volume-flow of the gas; a quality-measurer operated proportionally to changes in a density-influencing quality of said gas; an integrating meter-mechanism; means for operatively connecting and disconnecting said meter-mechanism with said rotary-vane meter; and means controlled by said quality-measurer for proportioning the duration of the operative connections of said meter-mechanism with said rotary-vane meter to the values of said density-influencing-quality.

2. In a compensating meter for measuring the flow of gas, a cylindrical gear-drum having a helical terminal edge; means for rotating said gear-drum commensurately with the volume-flow of gas; integrating meter-mechanism; gearing for driving said meter-mechanism comprising, a gear for driven engagement with said gear-drum and movable axially along said gear-drum; and means comprising a mechanical relay for moving said gear axially along said gear-drum in response to changes in the measure of a quality of influencing the density of said gas.

3. A compensating meter for measuring the flow of gas comprising, a volume-measurer driven at a rate in proportion to the rate of the volume-flow of said gas; a registering index; variable gearing operatively connecting said index and said volume-measurer and operative to proportion the operation of said index to the condition of a density-influencing quality of said gas and also to the volume-flow of said gas, said gearing comprising a mechanical relay responsive in its actuation to the condition of said density influencing quality.

4. A mechanism for measuring the density of a fluid comprising, a casing providing a pocket in free communication with the fluid to be measured and arranged to be partly filled with a liquid heavier than said fluid; a hollow inverted bottle-like caisson fixed within said pocket to trap a body of elastic fluid when said caisson is immersed in said liquid and whereby a movement of said liquid relatively to and from said pocket and said caisson is effected upon changes in the density of said fluid; and indicating means controlled by the said movement of said liquid.

5. A mechanism for measuring the density of a fluid comprising, a casing providing a pocket in free communication with the fluid to be measured and arranged to be partly filled with a liquid heavier than said fluid; a hollow inverted bottle-like caisson fixed within said pocket to trap a body of elastic fluid when said caisson is immersed in said liquid and whereby the relative levels of said liquid within said pocket and within said caisson vary with the density of said fluid; and means controlled by the level of said liquid in said pocket for measuring the density of said fluid.

6. A mechanism for measuring the density of a fluid comprising, a casing providing a pocket in free communication with the fluid to be measured and arranged to be partly filled with a liquid heavier than said fluid; a hollow inverted bottle-like caisson fixed within said pocket to trap a body of elastic fluid when said caisson is immersed in said liquid and whereby the relative levels of said liquid within said pocket and within said caisson vary with the density of said fluid; a float for the liquid in said pocket; and means operated by the movement of said float for measuring the density of said fluid.

In witness whereof, I have signed my name to this specification, in the presence of two subscribing witnesses.

SIDNEY A. REEVE.

Witnesses:
SIDNEY NEWBORG,
LEONARD DAY.